Dec. 22, 1936.　　　　　L. LYNES　　　　　2,065,085
VEHICLE VENTILATOR
Filed Oct. 11, 1934　　　4 Sheets-Sheet 1
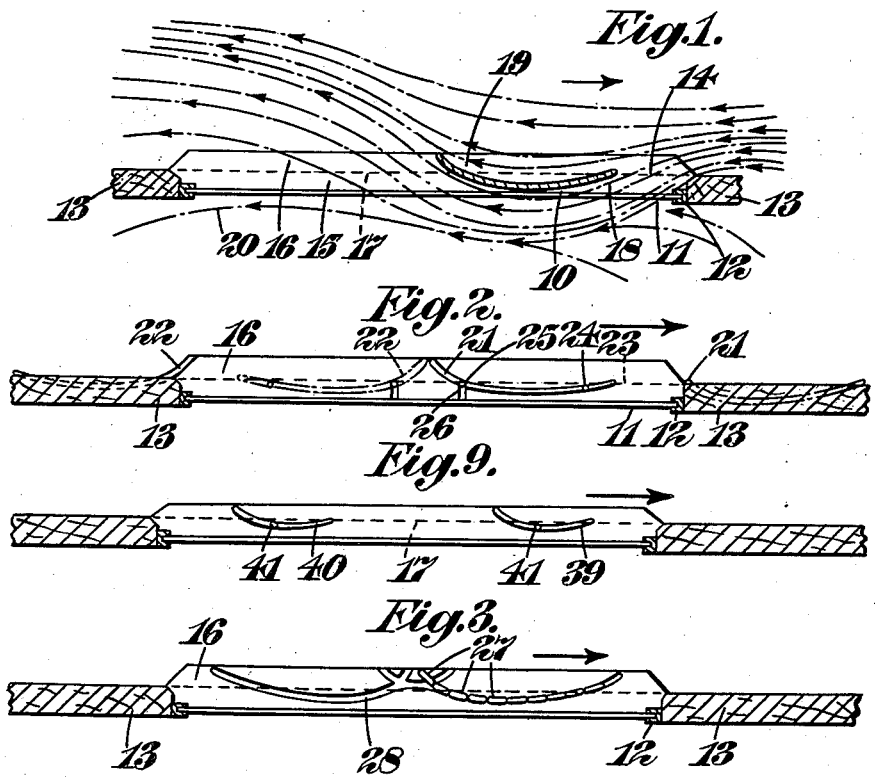
Inventor:
Lionel Lynes,
By Byrnes, Stebbins & Blenko,
attys.

Dec. 22, 1936.     L. LYNES     2,065,085
VEHICLE VENTILATOR
Filed Oct. 11, 1934     4 Sheets—Sheet 2
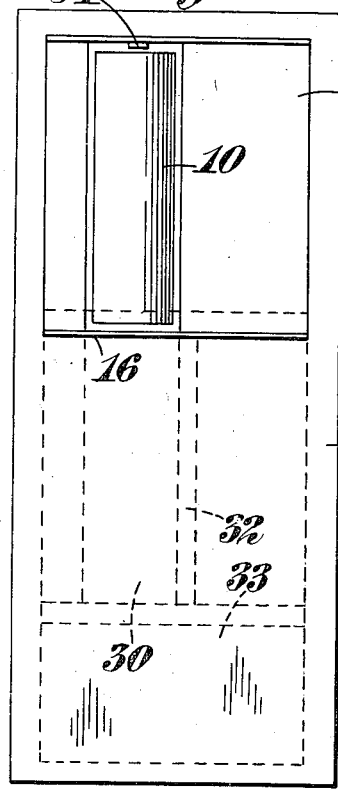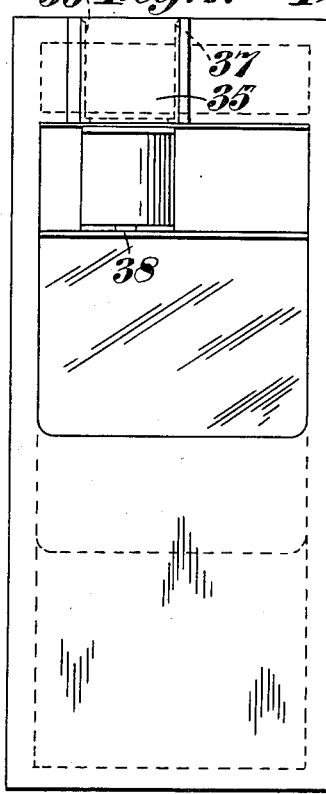
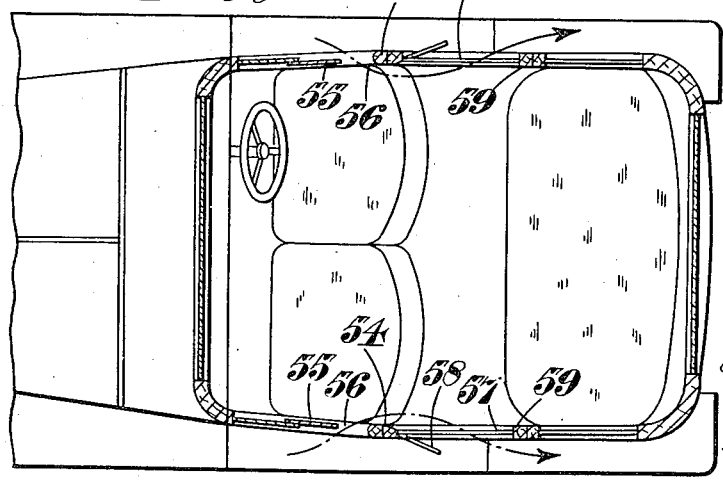

Dec. 22, 1936.  L. LYNES  2,065,085
VEHICLE VENTILATOR
Filed Oct. 11, 1934   4 Sheets-Sheet 3
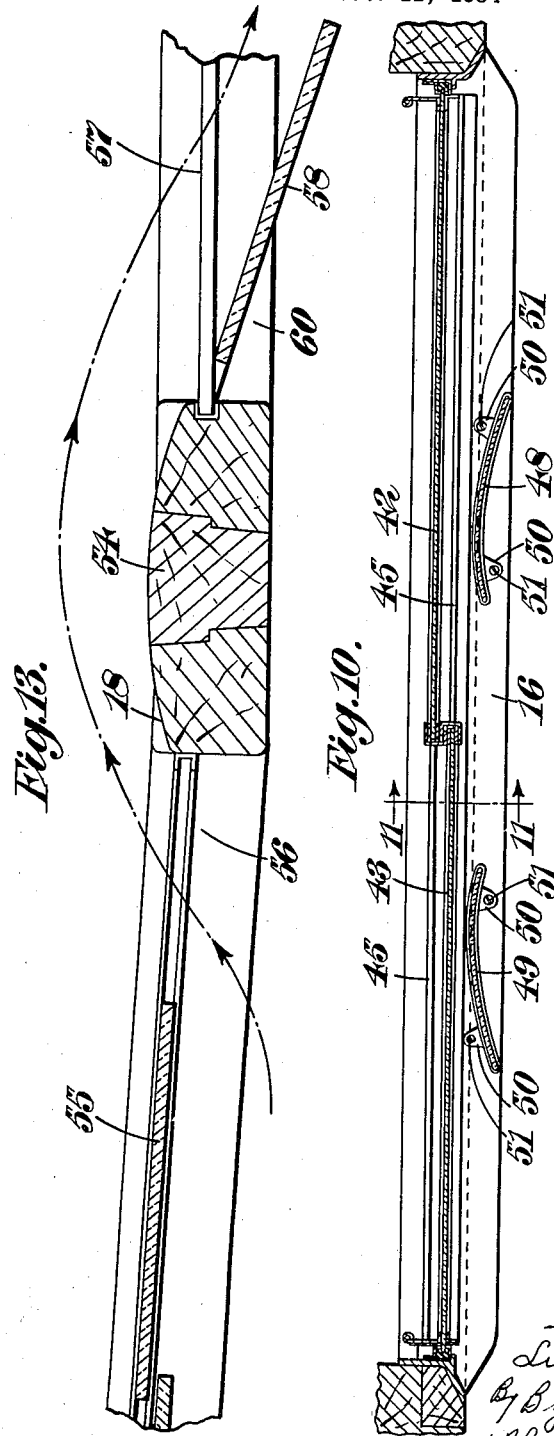
Inventor:
Lionel Lynes,
By Byrnes, Stebbins
+ Blenko, Attys.

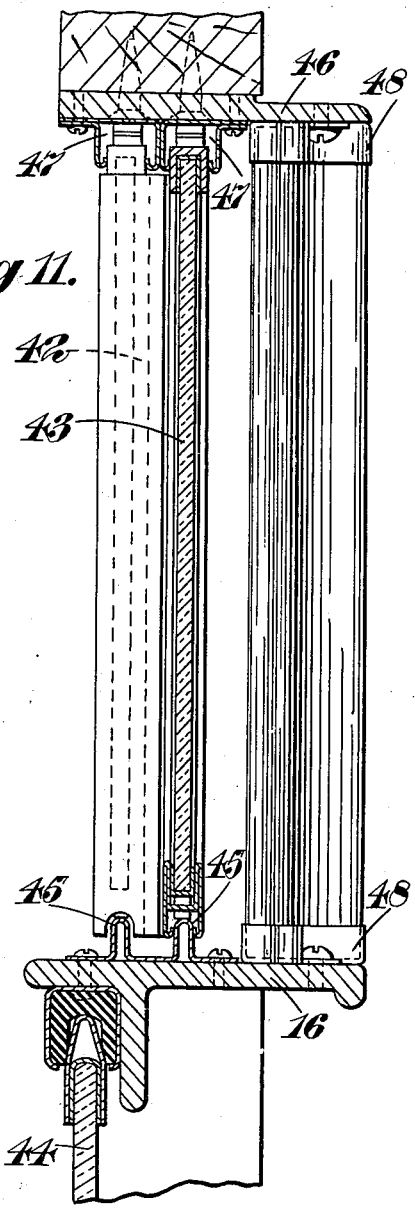

Patented Dec. 22, 1936

2,065,085

UNITED STATES PATENT OFFICE 2,065,085

VEHICLE VENTILATOR

Lionel Lynes, London, England

Application October 11, 1934, Serial No. 747,942
In Great Britain October 19, 1933

12 Claims. (Cl. 98—2)

This invention is for improvements in or relating to ventilators for moving vehicles, such as railway carriages, motor coaches etc.

According to this invention, a ventilator for a moving vehicle comprises a ventilation opening, the general plane of which is arranged parallel to or slightly inclined to the direction of travel of the vehicle and a vane so arranged in said opening that the general plane of the vane is parallel or slightly inclined to the plane of the opening, which vane is so shaped that when in position its inner face near the leading edge is flared outwardly and so that its outer face near the trailing edge is also flared outwardly to a greater extent than that of the leading edge. It is thought that the stream of outside or fresh air entering at the leading aperture into the space to be ventilated is guided along the inside face of the vane and the greater part thereof is aided in its escape through the rearward opening by reason of the flaring at the rear of the vane. A certain amount, however, of the introduced air remains in the space to be ventilated and displaces the vitiated air through the rearward opening. The combined action of the force of the air stream and the escaping air effectively prevents penetration of outside air currents entering the opening at the rear edge of the vane, as do also the air currents produced outside the opening by the aforesaid rearward flaring. The displacement of air from the vehicle will cause a continuous change of air to take place while the vehicle is in motion at such a modulated rate and manner that ventilation will be provided without causing annoyance to the passengers by the entering of the uncontrolled air from outside the vehicle. By varying the extent of flaring at either end of the vane, the quantity of air displaced from the vehicle may be regulated.

A feature of the invention consists in that said vane is so arranged in said opening that its leading edge is nearer to the leading edge of the opening than is the trailing edge to the trailing edge of the opening; for example, a ventilator for association with a window of a railway vehicle of a width of 18½ inches comprises a vane 6½ inches in width which is arranged with its leading edge 3 inches from the leading edge of the window opening and with its trailing edge 9 inches from the trailing edge of the window opening. Alternatively, in the case of a large saloon window 45 inches in width, a vane 15 inches in width is arranged with its leading edge 8½ inches from the leading edge of the window opening and its trailing edge 21½ inches from the trailing edge of the window opening.

A further feature of the invention consists in that a vane is so shaped and positioned that at least the trailing edge thereof is arranged to lie on the outside of the plane of said opening; for example, the whole of the vane may be disposed outside the plane of the opening.

A still further feature of the invention consists in that the face of the vane which is directed towards the inside of the opening is convexly curved, while the outer surface of the vane may be concavely curved. Furthermore, the section of the vane in a plane parallel to the direction of movement of the vehicle and transverse to the plane of the opening may be streamline in shape (e. g. it may have an aerofoil section).

In any of the arrangements described above, the width of the opening at the leading edge of the opening, the width of the vane itself and the width of the opening in the trailing edge of the vane are proportioned approximately in the ratio of 1:2:3.

Other features of the invention consist in mounting the vane in the opening so that it is either movable in the fore and aft direction or in an up and down direction, and in the provision of means for housing the vane when it has been withdrawn by the above movements from opposite the opening. Means may also be provided for pivoting the vane about an upright axis. Furthermore, one or more shutters movable in a fore and aft direction may be associated with said ventilating opening and arranged to vary the extent of the gaps at the leading and/or trailing edges of said vanes. It will be appreciated that more than one vane may be employed if required; for example, two vanes may be disposed in the opening and may be shaped in the manner set forth above, one of which is appropriately shaped for the movement of the vehicle in one direction and the other is appropriately shaped for the movement of the vehicle in the other direction and one or more shutters are arranged to be movable in said opening so as to obscure the opening opposite one vane while leaving free the opening opposite the other vane. Preferably two shutters are arranged to slide in said opening.

Another feature of the invention which particularly concerns railway vehicles, consists in that an outwardly projecting sill is provided which is arranged to extend along the length of the lower edge of the ventilating opening.

The object of this arrangement is to prevent up draughts which are caused by the displacement of the air by the vehicle from entering the ventilating opening.

A number of embodiments of the invention are now described with reference to the accompanying drawings, in which—

Figure 1 is a horizontal section through the window frame of a vehicle and is of a diagrammatic nature for illustrating the general principle of the invention;

Figure 2 is a similar view to Figure 1 showing a somewhat wider window opening provided with two movable vanes;

Figure 3 is a similar view to Figure 2 showing means for mounting a flexible vane;

Figures 4, 5 and 6 are side elevation, vertical and horizontal sections respectively of an arrangement in which the vane may be withdrawn into a compartment below the ventilating opening;

Figures 7 and 8 are similar views to Figures 4 and 5 and show an arrangement in which the vane may be housed in a compartment above the ventilating opening;

Figure 9 is a similar view to Figures 2 and 3 showing an arrangement in which two vanes are associated with the ventilating opening;

Figures 10 and 11 which are horizontal and vertical sections respectively show another arrangement in which two vanes are associated with a vehicle window;

Figure 12 is a diagrammatic horizontal section of a motor car body showing how the invention may be applied to the vehicle windows; and Figure 13 is a somewhat more detailed view of a part of Figure 12.

Referring to Figure 1, the top part of the figure represents the outside of the carriage, while the bottom part of the figure represents the inside. The carriage is assumed to be moving in the direction of the arrow shown at the top of the figure. The vane 10 may be arranged to extend for the full height of the opening of the window, as shown in Figures 4 and 5, or may be arranged to extend only partly down the depth of the opening, as shown in Figure 7. It is shown associated with a window pane 11 which is vertically slidable in guideways 12 attached to the window frame 13. It will be noted that the opening designated generally by 14 between the leading edge of the vane and the leading part of the window frame 13 is considerably smaller than the opening designated generally by 15 between the trailing edge of the vane and the trailing part of the window frame. The ratio of the width of the opening 14, the width of the vane 10 and the width of the opening 15 is approximately 1:2:3. Disposed along the lower edge of the whole of the window opening is an outwardly projecting sill 16 the purpose of which has been referred to earlier in the specification. The dotted line 17 represents the general plane of the outside of the window opening, and it will be noted that the leading edge of the vane 10 is disposed slightly outside said plane, whereas the trailing edge projects considerably out of said plane. The inner face of the vane is shown to be convexly curved, while the outer face is concavely curved. In horizontal cross-section the vane may be of streamline form, although this is not esential. An important feature, however, is that the inside face of the vane at its leading edge should be slightly outwardly-flared, to give best results, as should also be the outer face of the vane at the trailing edge thereof. It is thought that the shape of the remaining faces of the vane is not so important. The fine lines with arrows shown in Figure 1 indicate what is thought to be the nature of the air flow. The effect of the outwardly-flared leading edge 18 is to cause air to flow into the opening and for the most part to flow in an orderly stream along the inside face of the vane and out through the opening at the trailing edge. A part of the introduced air, however, replaces the vitiated air of the compartment which is entrained as indicated at 20 in the aforesaid stream and is expelled from the compartment. The outwardly-flared trailing edge assists in the aforesaid action and also prevents the air stream outside the compartment from entering through the trailing opening. It will be appreciated that the arrangement shown in Figure 1 is suitable for a vehicle which travels in one direction only. Since, however, vehicles such as railway vehicles require to travel in both directions, there is shown in Figures 2 and 3 and arrangement suited for that purpose.

In the construction shown in Figure 2, two vanes 21 and 22 are provided, which vanes are slidably mounted in guideways so as to be horizontally movable into and out of the window opening. When the vehicle is moving in a direction indicated by the arrow, the right hand vane is moved from the position shown in dotted lines into the position shown in full lines, while when the vehicle is moving in the opposite direction the vane 22 is moved from the position in which it is shown in full lines to the position in which it is shown in dotted lines. When in an operative position, each vane is disposed so as to provide leading and trailing openings of the same ratio provided by the construction according to Figure 1. Each vane may be pivotally mounted on a slide member so that it may be swung about vertical axis 24 disposed near its leading edge, while its trailing edge may carry a pin 25 which is guided by a slot 26 in the slide member.

In the arrangement shown in Figure 3, the vane is constructed from a number of vertical slats 27 which are hinged together along their edges and the upper and lower ends of these slats are arranged to engage with tracks 28 which are shaped to modify the shape of the vane as a whole as it is moved along the track. Thus, when the vehicle is moving in one direction, the vane may be moved along to that end of the track which is appropriately shaped to give the vane the formation required for the direction of travel.

In the construction shown in Figures 4, 5 and 6 the vane is mounted in the door of a vehicle, in such a manner that it may be slid vertically either into a position opposite the window opening or into a recess 30 formed in the outer face of the door 29. For this purpose the recess may be provided with two upright guideways 31 and 32 shown in Figure 6, and a faring 33 may be arranged to obscure the recess but leave a slot for the projecting trailing edge 19 of the vane. In order to retain the vane in its extended position, its upper edge may be provided with a catch 34 for engaging an appropriate member at the top of the door frame. A suitably shaped slot is also formed in the sill 16 which permits the vane to be slid into and out of the recess 30.

In the construction shown in Figures 7 and 8 the vane is arranged to be housed when not in use in a compartment 35 formed at the upper part of the window frame. As in the construction last described, the compartment is provided with suitable guideways 36 and 37 for the edges of the vane, while the lower edge of the vane is provided with a catch 38 for engaging with a suitable member at the top of the window pane.

In the construction shown in Figure 9, two vanes 39 and 40 are provided which are pivotally mounted to swing about upright axes 41. When the vehicle is travelling in the direction shown by the arrow in the figure, both vanes are arranged with their trailing edges extending outside the plane 17 of the opening, while should the vehicle be reversed, they may be swung so that the opposite ends are outside the plane of the opening. In whichever direction the vehicle is moving, the rearmost vane functions as an extractor only, while it will be noted that the forward vane is so disposed that the ratio of the width of the openings in front of it and behind it and the width of the vane itself conform to the ratio set out earlier in this specification. Thus, the ventilating air will flow into the opening in front of the forward vane and out through the opening between the two vanes, whereas the reduction of pressure provided outside the opening by the trailing edge of the rearmost vane will effect the aforementioned extraction action.

In the construction shown in Figures 10 and 11, the vehicle window is provided above the main window pane 44 with two horizontally sliding window panes 42 and 43, which are arranged to overlap slightly when in a closed position. As in the previous construction, a sill 16 is arranged to extend along the length of the bottom of the ventilating opening, which sill may comprise a part of the frame which carries the main window pane 14 and also the guideways 45 for the panes 42 and 43. A somewhat similar sill 46 is provided along the upper edge of the ventilator opening which carries the guideways 47 for the upper edges of the panes 42 and 43. Secured between the two sills 46 and 16 are two vanes 48 and 49. The vanes are formed from glass or other material and their upper and lower edges are engaged by frame members 49 which are provided with lugs 50. Bolts 51 are arranged to secure said lugs to the sills. As distinct from the construction shown in Figure 9, only one of the vanes is arranged to operate at a time. It will be noted that the vanes are arranged at equal distances from either side of the vertical centre line of the ventilating opening, and the vanes are shaped to be a complement of one another. When the vehicle is moving in a direction from right to left of the figure, the inner pane 42 is moved to the left, and it can be seen that when the panes are in this position, the ventilating opening at the leading edge of the vane 48 is less than the ventilating opening at its trailing edge. Similarly, if the vehicle is moving from left to right of the figure, both the panes will be slid to their right-hand position, whereupon the opening in front of the vane 49 will be less than the opening at the trailing edge thereof. If desired, a single sliding pane may be employed, this being arranged to slide to open one end or the other of the opening to allow one vane or the other to function.

It will be appreciated that when the vanes are immediately opposite the panes, the former will cease to function.

In Figures 12 and 13, the invention is shown applied to a motor road vehicle. In this arrangement, the upright pillar 54 between the forward and adjacent windows constitutes a part of the ventilating vane. The forward window is provided with a horizontally-sliding window pane, whereby the width of the gap 56 in front of the pillar 54 may be so adjusted in relation to the gap between the trailing edge of the vane 58 and the rear pillar 59 of the second window as to satisfy the conditions set out above. Referring to Figure 13, it will be noted that the inner face of the leading edge of the pillar 54 is outwardly flared at 18 in the manner described with reference to Figure 1. Since the width of the pillar is not sufficient to provide the necessary width of the vane, the trailing part of the vane is constituted by a flat vertically disposed sheet of glass or other material 58 which may be secured to the window sill 60 of the second window. As will be seen from Figure 13, the glass is directed outwardly as it extends away from the pillar 54. By adjusting the sliding window 55, the required degree of ventilation is obtained without objectionable draughts. The modifications shown in these figures constitute the subject matter of my copending application, Serial No. 28,889, filed June 28, 1935, for Vehicle bodies.

It will be appreciated that many modifications may be made to details of the above constructions without departing from the scope of this invention; for example, if desired, slots may be provided in the ventilating vanes.

I claim:—

1. A ventilator for a moving vehicle comprising a frame surrounding a ventilating opening which frame is adapted to be disposed with the plane of the opening approximately parallel with the general direction of the travel of the vehicle, a vane arranged in said opening approximately parallel with said plane, which vane has its inner face near the leading edge flared outwardly and its outer face near the trailing edge also flared outwardly to a greater extent than that of the leading edge.

2. A ventilator for a moving vehicle comprising a frame surrounding a ventilating opening, which frame is adapted to be disposed with the plane of the opening approximately parallel with the general direction of the travel of the vehicle, a vane arranged in said opening approximately parallel with said plane and with its leading edge nearer the leading edge of the opening than its trailing edge to the trailing edge of the opening, which vane has its inner face near the leading edge flared outwardly and its outer face near the trailing edge flared outwardly to a greater extent than that of the leading edge.

3. A ventilator for a moving vehicle comprising a frame surrounding a ventilating opening, which frame is adapted to be disposed with the plane of the opening approximately parallel with the general direction of the travel of the vehicle, a vane arranged in said opening approximately parallel with said plane and with its leading edge nearer the leading edge of the opening than its trailing edge to the trailing edge of the opening, which vane has its inner face near the leading edge flared outwardly and its outer face near the trailing edge flared outwardly to a greater extent than that of the leading edge and has at least its trailing edge disposed outside the plane of said opening.

4. A ventilator for a moving vehicle comprising a frame surrounding a ventilating opening which frame is adapted to be disposed with the plane of the opening approximately parallel with the general direction of the travel of the vehicle, a vane disposed approximately parallel with and on the outside of the plane of the opening with its leading edge nearer the leading edge of the opening than its trailing edge to the trailing edge of the opening, which vane has its inner face near the leading edge flared outwardly and its outer face near the trailing edge flared outwardly to a greater extent than that of the leading edge.

5. A ventilator for a moving vehicle comprising a frame surrounding a ventilating opening, which frame is adapted to be disposed with the plane of the opening approximately parallel with the general direction of the travel of the vehicle, a vane arranged in said opening approximately parallel with said plane with its leading edge nearer the leading edge of the opening than its trailing edge to the trailing edge of the opening, which vane is curved so that its leading edge is flared outwardly as is also its trailing edge but to a greater extent than the leading edge.

6. A ventilator for a moving vehicle comprising a frame surrounding a ventilating opening which frame is adapted to be disposed with the plane of the opening approximately parallel with the general direction of the travel of the vehicle, a vane arranged in said opening approximately parallel with said plane and with its leading edge nearer the leading edge of the opening than its trailing edge to the trailing edge of the opening, which vane is shaped so that its section in a plane parallel with the direction of movement of the vehicle and transverse to the plane of the opening is stream line in shape and has its leading and trailing edges flared outwardly.

7. A ventilator for a moving vehicle comprising a frame surrounding a ventilating opening, which frame is adapted to be disposed with the plane of the opening approximately parallel with the general direction of the travel of the vehicle, a vane so dimensioned and disposed in said opening that it is approximately parallel with said plane and that the width of the opening at the leading edge of the vane, the width of the vane itself and the width of the opening at the trailing edge of the vane are approximately in the ratio of 1:2:3 which vane has its inner face near the leading edge flared outwardly and its outer face near the trailing edge flared outwardly to a greater extent than that of the leading edge.

8. A ventilator for a moving vehicle comprising a frame surrounding a ventilating opening, which frame is adapted to be disposed with the plane of the opening approximately parallel with the general direction of the travel of the vehicle, a plurality of vanes disposed in said opening approximately parallel with said plane and so that the gap between the leading edge of a forward vane and the edge of the opening is less than the opening between the trailing edge of that vane and the leading edge of the next adjacent vane, each of which vanes has its inner face near the leading edge flared outwardly and its outer face near the trailing edge flared outwardly to a greater extent than that of the leading edge.

9. A ventilator for a moving vehicle comprising a frame surrounding a ventilating opening, which frame is adapted to be disposed with the plane of the opening approximately parallel with the general direction of the travel of the vehicle, a vane arranged in said opening approximately parallel with said plane, which vane has its inner face near the leading edge flared outwardly and its outer face near the trailing edge also flared outwardly to a greater extent than that of the leading edge, a shutter disposed in said opening and movable in a fore and aft direction and adapted to vary the size of the opening between said vane and frame.

10. A ventilator for a moving vehicle comprising a frame surrounding a ventilating opening, which frame is adapted to be disposed with the plane of the opening approximately parallel with the general direction of the travel of the vehicle, two vanes disposed apart in a fore and aft direction in said opening so as to be approximately parallel with the plane thereof, each of which vanes has its inner face outwardly flared along each edge thereof, the extent of flaring along that edge which is nearer the side of the frame being greater than that of the other edge, a shutter movable in a fore and aft direction in said opening and adapted to obscure the opening opposite one vane while leaving free the opening opposite the other vane, the spacing apart of which vanes and the width of which shutter is such that when the shutter is at one limit of its movement, the gap adjacent that edge of the unobscured vane having the smaller flaring is less than the gap at the other edge thereof.

11. A ventilator for a moving vehicle, comprising a frame surrounding a ventilating opening, which frame is adapted to be disposed with the plane of the opening approximately parallel with the general direction of the travel of the vehicle, two vanes disposed apart in a fore and aft direction of said opening, so as to be approximately parallel with the plane thereof, each of which vanes has its inner face outwardly flared adjacent each edge thereof, the extent of flaring along that edge which is nearer the side of the frame being greater than that of the other edge, and two shutters mounted to move in a fore and aft direction in said opening and adapted between them to close the opening and, by moving one of them in the direction of movement of the vehicle, so as to lie opposite the other to provide an opening opposite one vane such that said vane has its leading edge nearer the leading edge of the opening than its trailing edge to the trailing edge of the opening.

12. A ventilator for a moving vehicle comprising a frame surrounding a ventilating opening, which frame is adapted to be disposed with the plane of the opening approximately parallel with the general direction of the travel of the vehicle, two vanes mounted in said opening so that each is rotatable about an axis in the plane of the opening and transverse to the direction of travel of the vehicle, which axis is disposed intermediate of the forward and rearward edges of the vane so that either of said edges may be disposed outside said opening, the inner face of each of which vanes is outwardly flared adjacent each edge thereof, which vanes are so disposed that the gap between them is greater than the gap between either of them and a side member of the frame.

LIONEL LYNES.